United States Patent [19]

Huisman et al.

[11] Patent Number: 4,678,705

[45] Date of Patent: Jul. 7, 1987

[54] COMPOSITION AND METHOD FOR MAKING MAGNETIC RECORDING ELEMENTS

[75] Inventors: Hendrikus F. Huisman, Teteringen; Henricus J. M. Pigmans, Eindhoven, both of Netherlands

[73] Assignee: E. I. Du Pont de Nemours and Company, Wilmington, Del.

[21] Appl. No.: 751,675

[22] Filed: Jul. 3, 1985

[30] Foreign Application Priority Data

Jul. 5, 1984 [NL] Netherlands .......................... 8402136

[51] Int. Cl.⁴ .............................................. G11B 5/708
[52] U.S. Cl. .............................. 428/315.9; 252/62.54; 427/128; 427/130; 428/315.5; 428/317.9; 428/694; 428/695; 428/900
[58] Field of Search ............ 428/694, 695, 900, 315.9, 428/315.5, 317.9; 427/128, 130; 252/62.54; 360/134–136

[56] References Cited

U.S. PATENT DOCUMENTS

| | | | |
|---|---|---|---|
| 3,387,675 | 6/1986 | Flowers | 117/121 |
| 3,766,067 | 10/1973 | McMillen | 106/306 |
| 4,015,042 | 3/1977 | Chassaigne | 428/329 |
| 4,032,682 | 6/1977 | Masson | 428/900 |
| 4,163,823 | 8/1979 | Legras | 428/900 |
| 4,279,945 | 7/1981 | Audran | 427/130 |
| 4,450,199 | 5/1984 | Tadokoro | 428/317.9 |
| 4,546,035 | 10/1985 | Ko | 428/317.9 |
| 4,596,739 | 6/1986 | Piltingrud | 428/317.9 |
| 4,626,463 | 12/1986 | Fujishiro | 428/695 |

*Primary Examiner*—Ellis P. Robinson

[57] ABSTRACT

A composition for making magnetic recording elements comprising finely divided particles of magnetic pigment dispersed in an organic medium comprising polymeric binder, lubricant, dispersing agent and porosity control agent dispersed in volatile organic solvent.

2 Claims, No Drawings

COMPOSITION AND METHOD FOR MAKING MAGNETIC RECORDING ELEMENTS

FIELD OF THE INVENTION

The invention relates to a magnetic recording element having improved lubricating properties.

BACKGROUND OF THE INVENTION

Magnetic recording elements are usually in either tape, disc or card form and are comprised of a nonmagnetic carrier (substrate) having at least one surface coated with a layer of magnetic pigment and lubricant dispersed by means of a dispersing agent in an organic polymeric binder. Such recording elements can be used for recording audio, video or digital information.

The problem underlying the present invention relates to the function of the lubricant. In particular, lubricants reduce the frictional force between the recording/playback head of the magnetic recording apparatus and the magnetic tape moving past the head. The lubricants are operative at the surface of the magnetic coating and they must be capable of reaching said surface. This implies that the lubricants are not quite compatible with the binder and, as a result of this, have a tendency to diffuse to the surface. This also implies that in the case of variations in temperature and degree of humidity, too much or too little lubricant may move to the surface. When too much lubricant reaches the surface, the magnetic tape becomes sticky and lubricant is deposited on the recording/playback head. On the other hand, in the case of too little lubricant, irregular tape travel is likely to be obtained.

BRIEF DESCRIPTION OF THE INVENTION

The problems of the prior art are in large part overcome by the invention which is directed to a composition for making magnetic recording elements of the type mentioned in the opening paragraph which are characterized in that the magnetic coating layer in the ready-for-use condition, hence after drying and calendering, has a structure of pores having a diameter of 5-100 nm, a pore volume which is 5-50% of the volume of the coating layer, and a pore surface which is at least 100 times larger than the free surface of the coating layer remote from the carrier, the pore structure forming a deposit for the lubricant.

The porous structure forms a buffer space for the lubricant, as a result of which a uniform diffusion of the lubricant takes place to the surface of the magnetic coating layer. The lubricant deposits on this surface in the form of a substantially monomolecular layer so that the effect of the lubricant is optimum and without the disadvantages mentioned hereinbefore occurring.

Therefore, in a primary aspect, the invention is directed to a composition for forming magnetic recording layers which comprises (1) finely divided particles of magnetic particles dispersed in a liquid medium comprising
(2) film-forming polymeric binder,
(3) 0.2-20% wt. lubricant, basis solvent-free layer,
(4) 0.5-6% wt. dispersing agent, basis magnetic pigment, and
(5) porosity control agent selected from metal salts of carboxylic acids, nonionogenic diurethanes, calcium-containing micellar organic complexes and mixtures thereof, all of (2) through (5) being dispersed in
(6) volatile organic solent.

In a second aspect, the invention is directed to a method for manufacturing magnetic recording elements which comprises the sequential steps of a. coating a layer of the above-described composition onto a surface of a nonmagnetic carrier;
b. removing essentially all of the volatile organic solvent by evaporation from the coated layer;
c. compressing the solvent-free coated layer, thus forming in the layer a structure of pores having a diameter of 5-100 nm, a pore volume which is 5-50% of the volume of the compressed layer, and a pore surface area which is at least 100 times the free surface area of the compressed layer.

In a third aspect, the invention is directed to a magnetic recording element which comprises a nonmagnetic carrier having coated on at least one surface thereof a compressed solvent-free layer of finely divided magnetic pigment particles dispersed in a porous matrix containing a polymeric binder, lubricant, dispersing agent, and a porosity control agent selected from metal salts of carboxylic acids, nonionogenic diurethanes, calcium-containing micellar organic complexes and mixtures thereof, the pores of the layer having a diameter of 5-100 nm, a volume which is 5-50% of the volume of the compressed layer and surface area which is at least 100 times the free surface area of the exposed surface of the compressed layer.

PRIOR ART

It is noted that German Auslegeschrift No. 25.33.850 discloses a magnetic recording element which has a porous structure in an intermediate phase, i.e. after drying of the magnetic coating but before calendering. For this purpose, at least two solvents having different vapor pressures are used in the magnetic coating layer, if desired in combination with different binders. Upon drying, i.e. upon removing the organic solvents, pores are formed in the magnetic coating layer. According to the above German Auslegeschrift, such a layer has the advantage that after calendering, i.e. compression of the coating layer, a very smooth surface is obtained. During calendering, the pores are compressed so that in the final phase the magnetic coating layer is no longer porous.

DETAILED DESCRIPTION OF THE INVENTION

In manufacturing a magnetic recording element, a coating layer is provided on the nonmagnetic carrier which comprises a binder, a solvent for the binder, a magnetic pigment which is dispersed in the solution of the binder by using a dispersing agent, a lubricant and optionally further auxiliary substances, for example, antistatics. The coating layer is dried in air, usually at elevated temperature at which the solvent evaporates. The layer is then compressed by means of a roller, as a result of which a smooth surface is obtained. Such a smooth surface is necessary to minimize the friction between the coating layer and the recording/playback head of the playback apparatus. The compression of the coating layer is termed a calendering process or calendering.

The magnetic recording element according to the invention may be manufactured according to the above process in which nonmagnetic pigment particles were additionally added to the coating layer.

The nonmagnetic carrier is manufactured, for example, from a synthetic resin such as a polyester. The magnetic pigment is of a usual type, for example, a pigment of Fe particles or $\gamma\text{-}Fe_2O_3$ particles, doped or not with other elements such as Co, Ni, Zn, Sn and Ti. Another suitable magnetic pigment is a pigment of $CrO_2$ particles.

The dispersing agent, binder and lubricant are also of the conventional type. Examples of suitable binders are polyvinyl chloride, polyvinyl acetate, polyester, polyesteramide, polyacrylate, polyurethane or copolymers of, for example, vinyl chloride, vinyl acetate, acrylonitrile, vinyl alcohol, vinyl butyral and vinylidene chloride. A suitable dispersing agent is lecithin, monoesters or diesters of phosphoric acid and alcohols which may be ethoxylated, alkarylsulphonic acids, etc. The quantity of dispersing agent is 0.5–6% by weight calculated on the quantity of pigment. Examples of lubricants are silicone oil, graphite, molybdenum disulphide, tungsten disulphide, petroleum jelly, paraffin and fatty acids such as oleic acid and stearic acid, fatty acid esters such as stearates and fatty acid amides such as stearyl amide. The preferred quantity is 0.2–20% by weight calculated on the total coating layer.

The magnetic coating layer may also contain other auxiliary substances, for example, antistatic agents such as soot.

According to the invention, the coating layer must contain a porosity control agent, i.e., an additive material to the coating layer which will assist in imparting a controlled degree of porosity to the calendered layer. In general, the types of materials which have been found suitable for this use are siccatives and/or thickening agents.

Siccatives and thickeners are generally known in the paint and lacquer industries. Suitable siccatives are, for example, metal salts of carboxylic acids such as zinc octoate. This product is used in the coating layer in a quantity from 0.5 to 5%, for example, 1%, calculated on the pigment.

In a preferred embodiment of the invention, a non-ionogenic diurethane is added to the coating layer as a thickener in a quantity of 1–10% by weight calculated on the binder.

The nonionogenic urethanes are known substances which are used as a thixotropic agent (thickener) in the paint industry. The substances are used, in particular, in high solids lacquers to prevent sagging and yet to maintain a certain degree of fluidity. Suitable noniongenic diurethanes are known inter alia from Netherlands Patent Application No. 7613121 published on May 29, 1978 (priority 25.11.76) in the name of AKZO N.V.

The nonionogenic diurethanes may be used with substantially any binder. When the nonionogenic diurethanes are used in the method according to the invention, a network of diurethane with binder is formed upon drying the magnetic coating layer.

This network ensures that the pores formed as a result of evaporation of the solvent do not disappear during the compression of the magnetic coating layer.

In another preferred embodiment of the invention, a calcium-containing miscellar organic complex is added to the coating layer as a thickener in a quantity of 1–10% by weight, basis binder polymer.

These calcium-containing miscellar organic complexes consist of $CaCO_3$ and at least one alkaline earth metal salt of an organic acid susceptible to overbasing in which the equivalent ratio of $CaCO_3$ to alkaline earth metal in the salt is 2:1 to 100:1. The complex particles have average crystallite sizes of 25 to 400 Å. These materials and their preparation are described in U.S. Pat. No. 3,766,067 to McMillen. A wide variety of organic acids are soluble in these complexes, including oil-soluble phosphorus acids, carboxylic acids and sulfur acids. The oil-soluble carboxylic and sulfonic acids are preferred. Suitable sulfonic acids are the petroleum sulfonic acids and alkalated benzene and naphthalene sulfonic acids. Particularly preferred thixotropic agents of this type are marketed by Lubrizol Corporation, Wickliffe, OH under the tradename Ircogel. It will be recognized that mixtures of the three general types of porosity control agents can be used as well. By changing the amount and type of porosity control agent it becomes possible to adjust the porosity which can be obtained upon calendering. As set out above, the pores of the layer should be 5–100 nm in diameter and the pore volume, after calendering, should be 5–50% (preferably 10–30%) of the volume of the compressed layer and the area of the exposed porous surface of the layer should be at least 100 times its superficial surface area. The combination of these porosity parameters greatly facilitates the effectiveness of the lubricant in the layer.

A typical formulation for use in making the recording elements of the invention and the properties of the recording elements made therefrom are given below:

| Component: Function | % By Wt. |
| --- | --- |
| Magnetic Pigment | 20.7 |
| Binder | 27.8 |
| Lubricant | 1.4 |
| Curing Agent | 1.0 |
| Dispersing Agent | 0.3 |
| Solvent | 36.7 |
| Thixotropic Agent | 2.0 |
| Tape Properties* | |
| Pore Volume | 28 |
| Pore Surface Area Ratio | 145 |
| Coefficient of Friction | |
| Initial | 0.21 |
| After Storage | 0.23 |

*After calendering at 200 kg/cm.

The invention will be described in more detail with reference to the specific examples.

EXAMPLES

Examples I–IV

The ingredients mentioned in Table 1 below were mixed for 2–5 hours in a bead mill having glass beads of a diameter of 1 mm. In this matter, various magnetic coating mixtures were manufactured as they are recorded in the table by the numerals I, II, III and IV. The coating mixture I contained no thickener (diurethane). The mixtures II–IV contained different percentages of diurethane.

Each coating mixture was coated on a tape of polyester in a thickness between 30 and 50 μm, for example, 40 μm. The tape with magnetic coating layers was dried for some time at an elevated temperature to evaporate the organic solvents. Finally, the tape with the substantially solvent-free magnetic coating layer was calendered by means of a steel roller (counter roller with coating of paper) at a line pressure of 100–200 kg/cm and a temperature of 80° C. The ultimate thickness of the coating layer was 5 μm.

The porosity of the magnetic coating layer (pore volume, pore diameter, pore surface) was measured according to methods known per se as described in I.E.E.E., May 20, 1984 (1), pp. 13–15. The measured values were recorded in the table. They are average values.

The coefficient of friction of each coating layer was also measured both immediately after manufacture and after storage at 60° C. and a relative humidity of 90% for 30 days. The measured average values are recorded in the table. The coating layer of tape No. I showed a sticky surface after storage. Pollution of the head of the playback apparatus occurred upon playing back the tape. Moreover, there was an irregular tape transport as a result of the high coefficient of friction. The coating layers of the tapes II, III and IV did not show this detrimental phenomenon.

TABLE 1

| Example No. | I | II | III | IV |
|---|---|---|---|---|
| Coating Layer Composition | | (grams) | | |
| $CrO_2$ | 99.2 | 99.2 | 99.2 | 99.2 |
| Dispersing Agent | 3.0 | 3.0 | 3.0 | 3.0 |
| Carbon | 2.1 | 2.1 | 2.1 | 2.1 |
| n-Butyl Stearate (Lubricant) | 2.5 | 2.5 | 2.5 | 2.5 |
| Tetrahydrofuran (Solvent) | 73.1 | 75.1 | 77.1 | 79.2 |
| Cyclohexanone (Solvent) | 73.1 | 75.1 | 77.1 | 79.2 |
| Polyurethane (Binder) | 97.3 | 92.4 | 87.5 | 82.7 |
| 17% Sol. in THF-Cyclo-hexanone | 2.2 | 2.2 | 2.2 | 2.2 |
| 1:1 Isocyanate (Hardener) | | | | |
| Diurethane (Thickener) | — | 0.8 | 1.7 | 2.5 |
| Pore Volume in % of Volume of Volume Coating Layer | — | 25 | 30 | 34 |
| Pore Diameter in nm | — | 30 | 26 | 30 |
| Ratio Pore Surface to Surface of Coating Layer | — | 133 | 184 | 180 |
| (Initial) Coefficient of Friction | 0.35 | 0.27 | 0.23 | 0.23 |
| Coefficient of Friction after 30 Days Storage at 60° C. and 90% Relative Humidity | 0.65 | 0.34 | 0.24 | 0.25 |

We claim:

1. A method for manufacturing magnetic recording elements which comprises the sequential steps of
   a. coating onto a surface of a nonmagnetic carrier a layer of a composition which comprises
      (1) finely divided particles of magnetic particles dispersed in a liquid medium comprising
      (2) film-forming polymeric binder,
      (3) 0.2–20% wt. lubricant, basis solvent-free layer,
      (4) 0.5–6% wt. dispersing agent, basis magnetic pigment, and
      (5) porosity control agent selected from metal salts of carboxylic acids, nonionogenic diurethanes, calcium-containing micellar organic complexes and mixtures thereof, all of (2) through (5) being dispersed in
      (6) volatile organic solvent:
   b. removing essentially all of the volatile organic solvent by evaporation from the coated layer;
   c. compressing the solvent-free coated layer, thus forming in the layer a structure of pores having a diameter of 5–100 nm, a pore volume which is 5–50% of the volume of the compressed layer, and a pore surface area which is at least 100 times the free surface area of the compressed layer.

2. A magnetic recording element which comprises a nonmagnetic carrier having coated on at least one surface thereof a compressed solvent-free layer of finely divided magnetic pigment particles dispersed in a porous matrix containing a polymeric binder, lubricant, dispersing agent, and a porosity control agent selected from metal salts of carboxylic acids, nonionogenic diurethanes, calcium-containing micellar organic complexes and mixtures thereof, the pores of the layer having a diameter of 5–100 nm, a volume which is 5–50% of the volume of the compressed layer and surface area which is at least 100 times the free surface area of the exposed surface of the compressed layer.

* * * * *

UNITED STATES PATENT AND TRADEMARK OFFICE
CERTIFICATE OF CORRECTION

PATENT NO. : 4,678,705
DATED : July 7, 1987
INVENTOR(S) : Hendrikus F. Huisman et al It is certified that error appears in the above-identified patent and that said Letters Patent is hereby corrected as shown below:

On the title page assignee should read

-- (73) Assignee: PD Magnetics, B.V., Oosterhout, The Netherlands --.

Signed and Sealed this

Second Day of August, 1988

Attest:

DONALD J. QUIGG

Attesting Officer

Commissioner of Patents and Trademarks